United States Patent
Wu (10) Patent No.: US 7,117,985 B2
(45) Date of Patent: Oct. 10, 2006

(54) ONE-WAY ROTATION CONTROL MECHANISM FOR GOLF CART

(76) Inventor: David Wu, No. 35-1, Jih Hsin Street, Tu Cheng City, Taipei Hsien (TW)

( * ) Notice: Subject to any disclaimer, the term of this patent is extended or adjusted under 35 U.S.C. 154(b) by 147 days.

(21) Appl. No.: 10/981,579

(22) Filed: Nov. 5, 2004

(65) Prior Publication Data
US 2006/0096828 A1   May 11, 2006

(51) Int. Cl.
*F16D 41/67*   (2006.01)
(52) U.S. Cl. ........................................ 192/45
(58) Field of Classification Search ........... None
See application file for complete search history.

(56) References Cited

U.S. PATENT DOCUMENTS

| 5,799,749 | A | * | 9/1998 | Yamamoto et al. | 180/247 |
| 6,073,741 | A | * | 6/2000 | Liu | 192/45 |
| 6,308,811 | B1 | * | 10/2001 | Chang | 192/20 |
| 6,467,596 | B1 | * | 10/2002 | Lay | 192/45 |

* cited by examiner

*Primary Examiner*—Saul Rodriguez
(74) *Attorney, Agent, or Firm*—Troxell Law Office PLLC (57) ABSTRACT

An one-way rotation control mechanism used in a golf cart's wheel to control one-way rotation of the wheel on a wheel axle is disclosed to include a bushing affixed to the wheel axle, and a clutch mounted in and fixedly connected to the wheel to control linking between the wheel and the fixed bushing at the wheel axle in one direction.

3 Claims, 10 Drawing Sheets

ONE-WAY ROTATION CONTROL MECHANISM FOR GOLF CART

BACKGROUND AND SUMMARY OF THE INVENTION

The present invention relates to an electric golf cart and more specifically, to a one-way rotation control mechanism used in an electric golf cart's wheel for controlling one-way rotation of the wheel.

Figure 1:
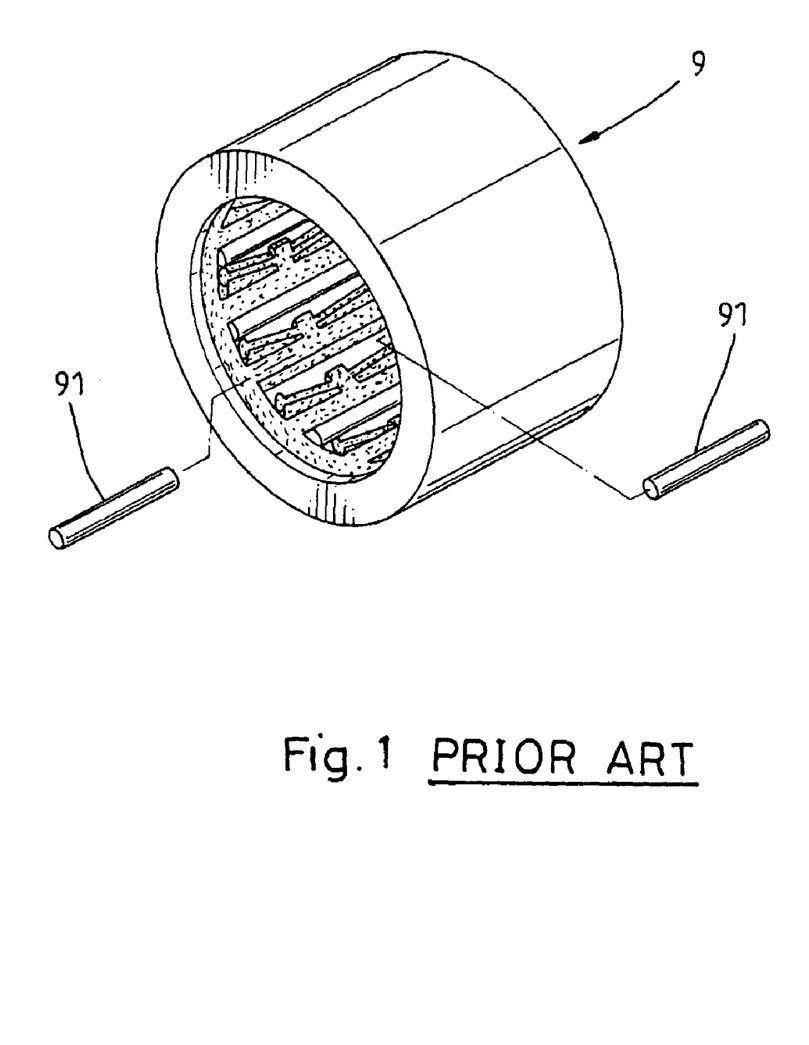
FIG. 1 is an exploded view of a conventional one-way bearing.
Figure 2:
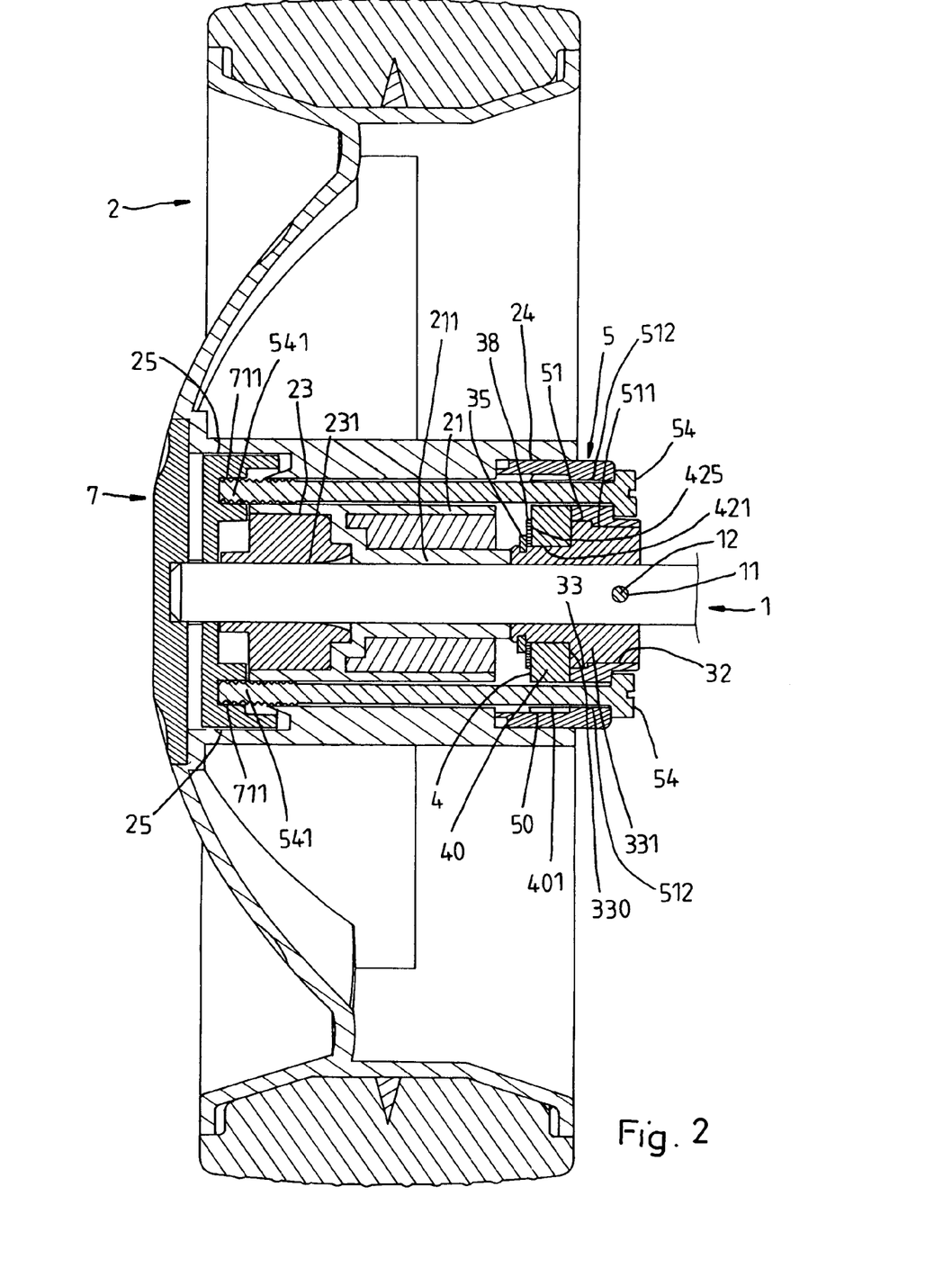
FIG. 2 is a sectional view showing a one-way rotation control mechanism installed in a wheel according to the present invention.
Figure 3:
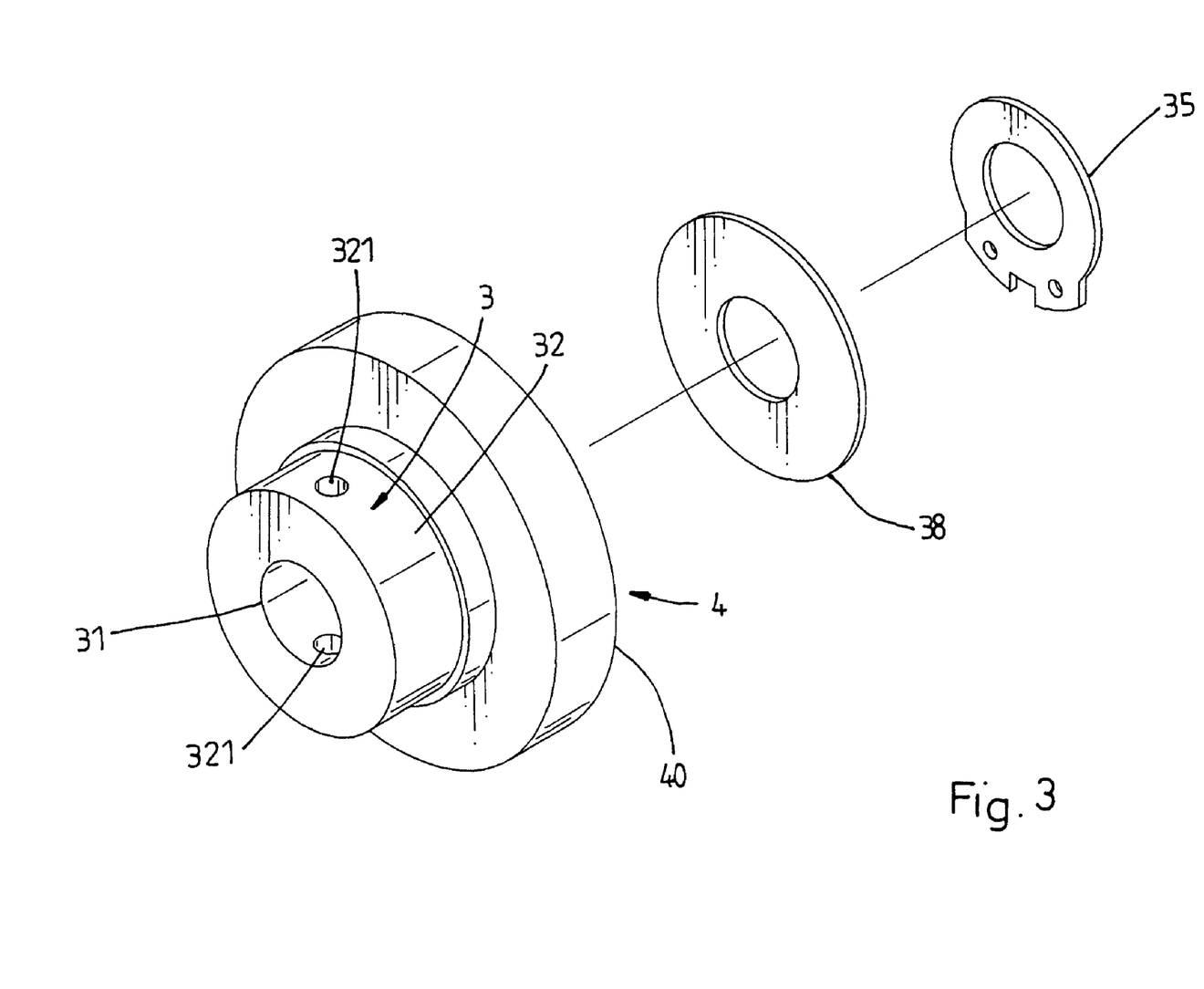
FIG. 3 is an exploded view of a part of the present invention.
Figure 4:
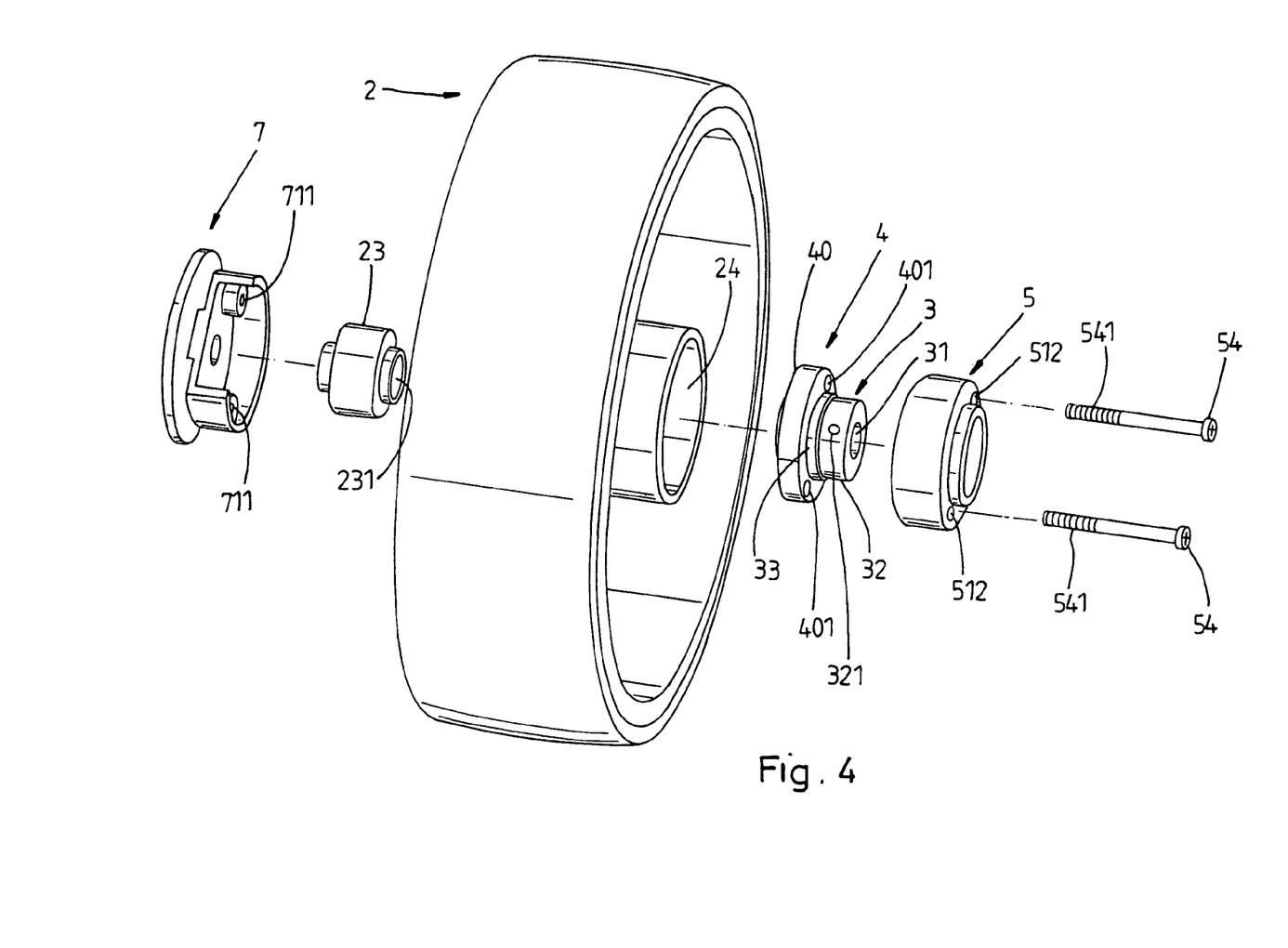
FIG. 4 is an exploded view of the assembly shown in FIG. 2.
Figure 5:
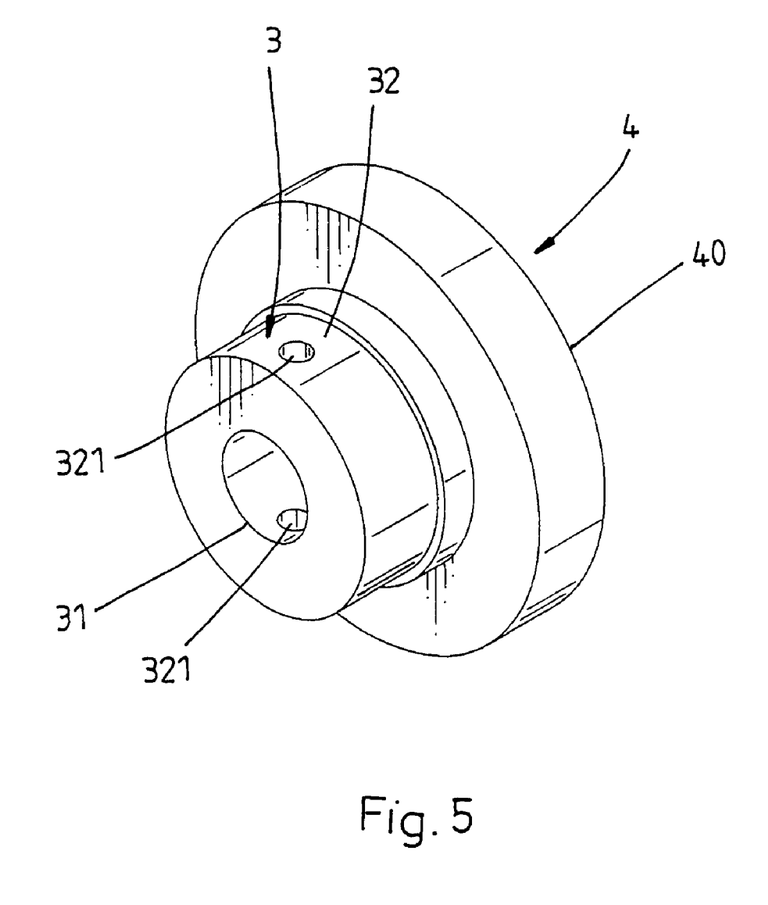
FIG. 5 is an elevational view of a part of the present invention, showing the clutch mounted on the second bushing.
Figure 6:
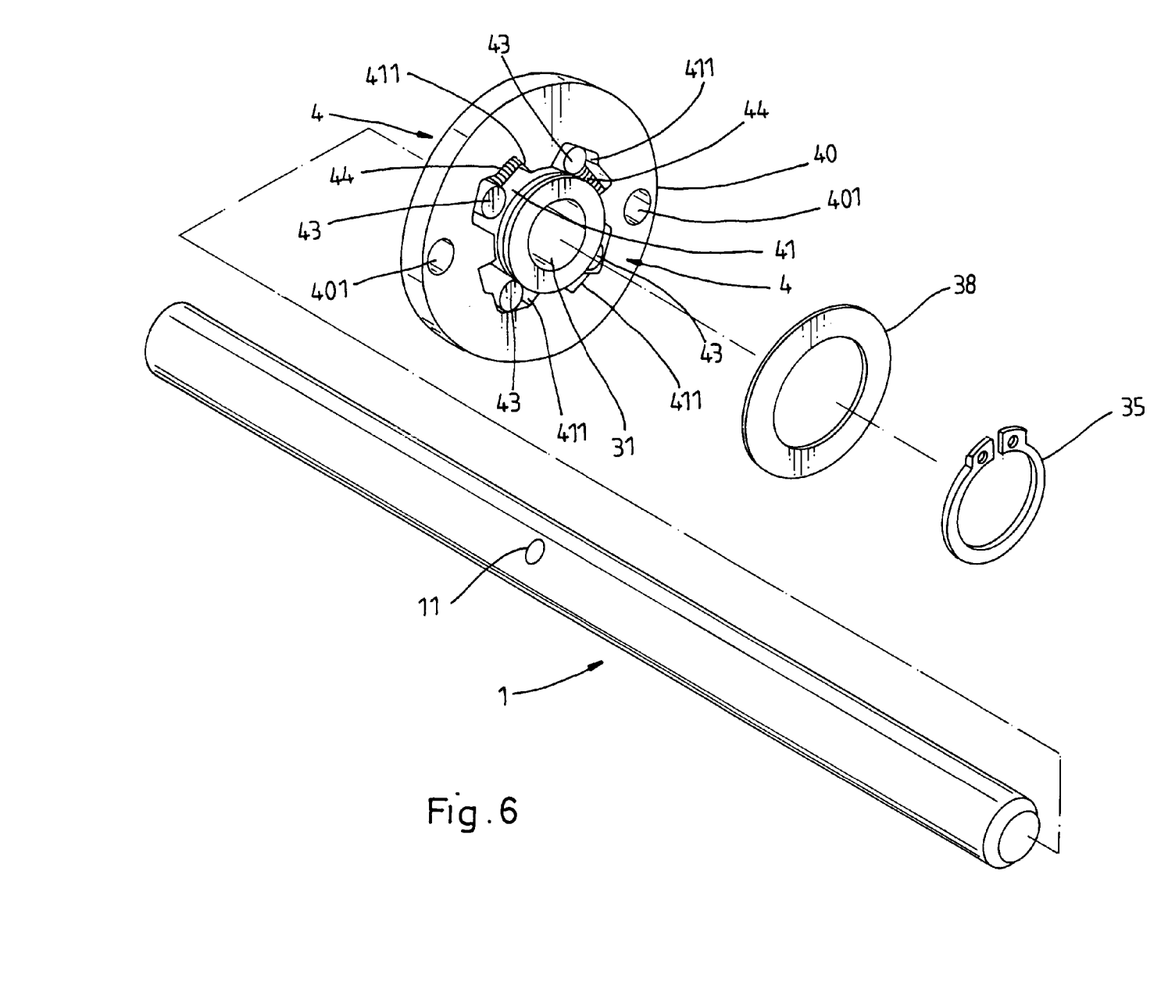
FIG. 6 is an exploded view showing the relationship between the clutch and the wheel axle according to the present invention.
Figure 7:
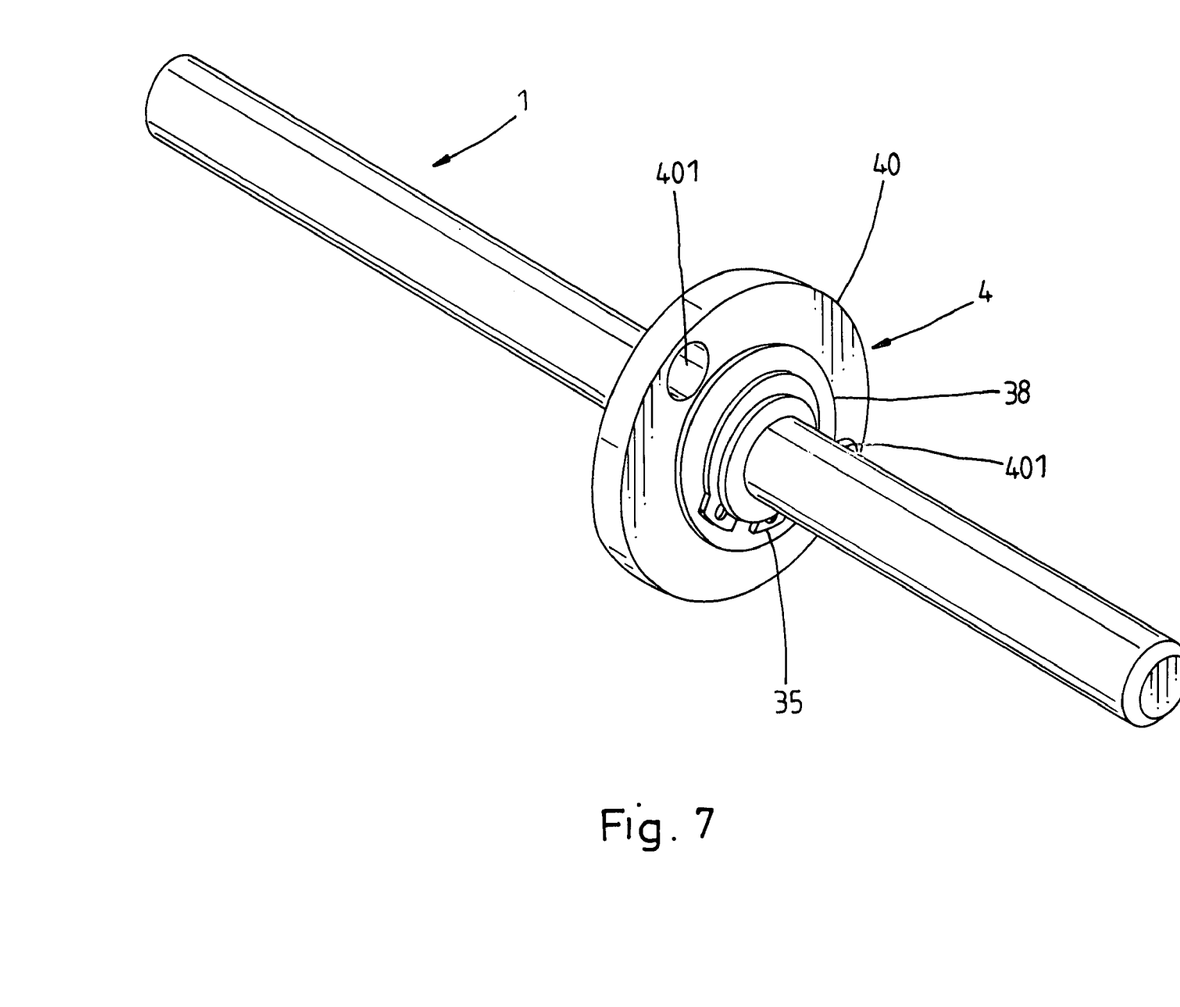
FIG. 7 is an assembly view of FIG. 6.
Figure 8:
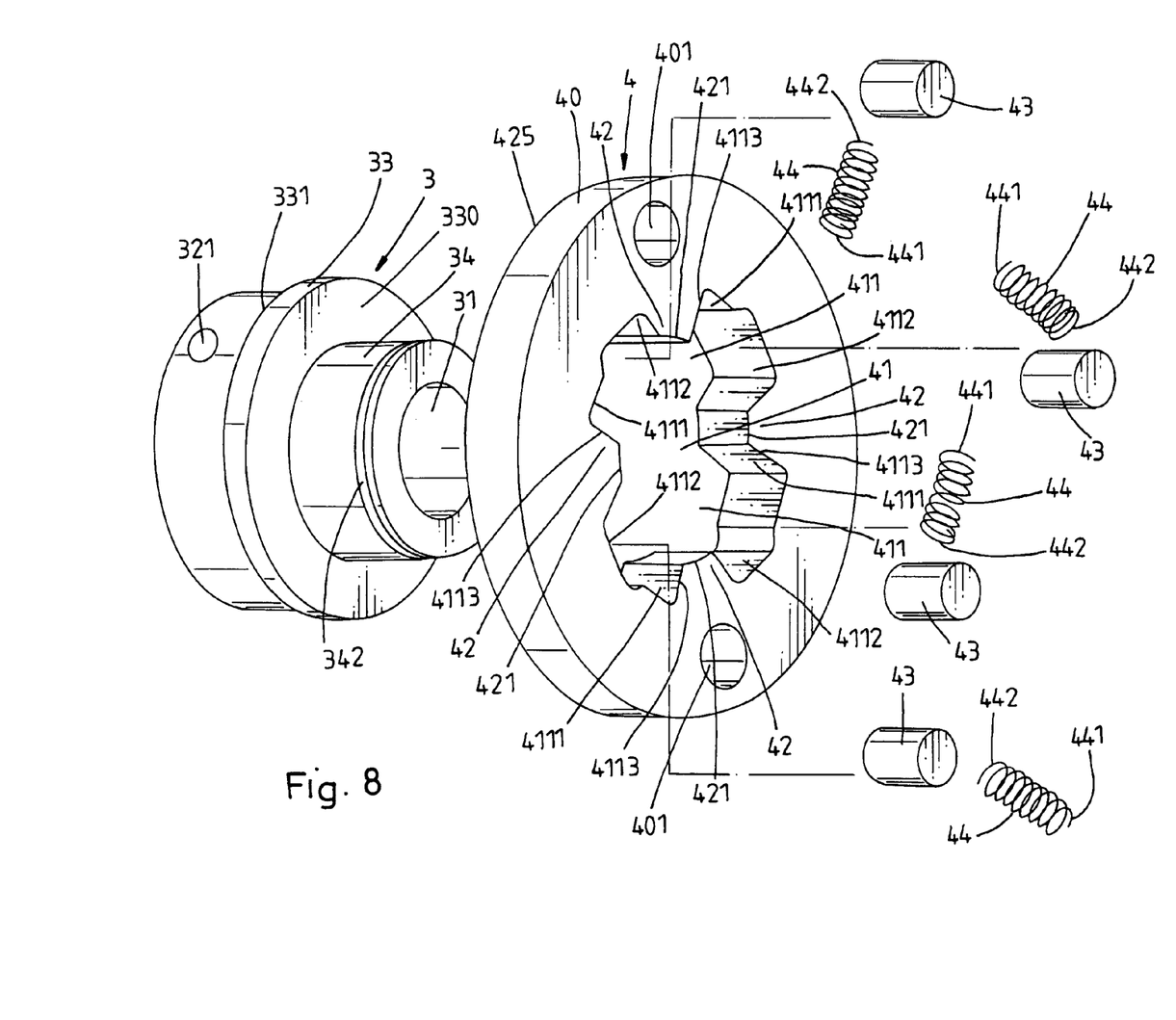
FIG. 8 is an exploded view of a part of the present invention, showing the structure of the clutch and the relationship between the clutch and the second bushing.
Figure 9:
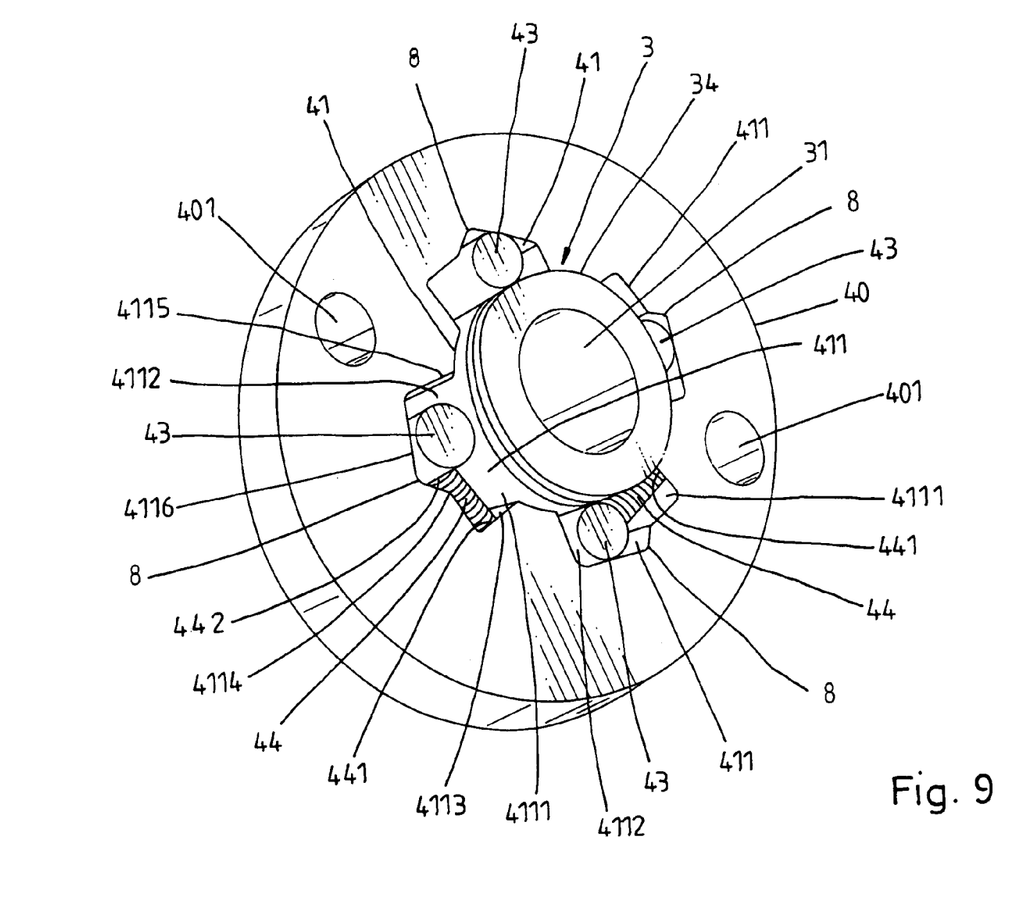
FIG. 9 is an assembly view of FIG. 8.
Figure 10:
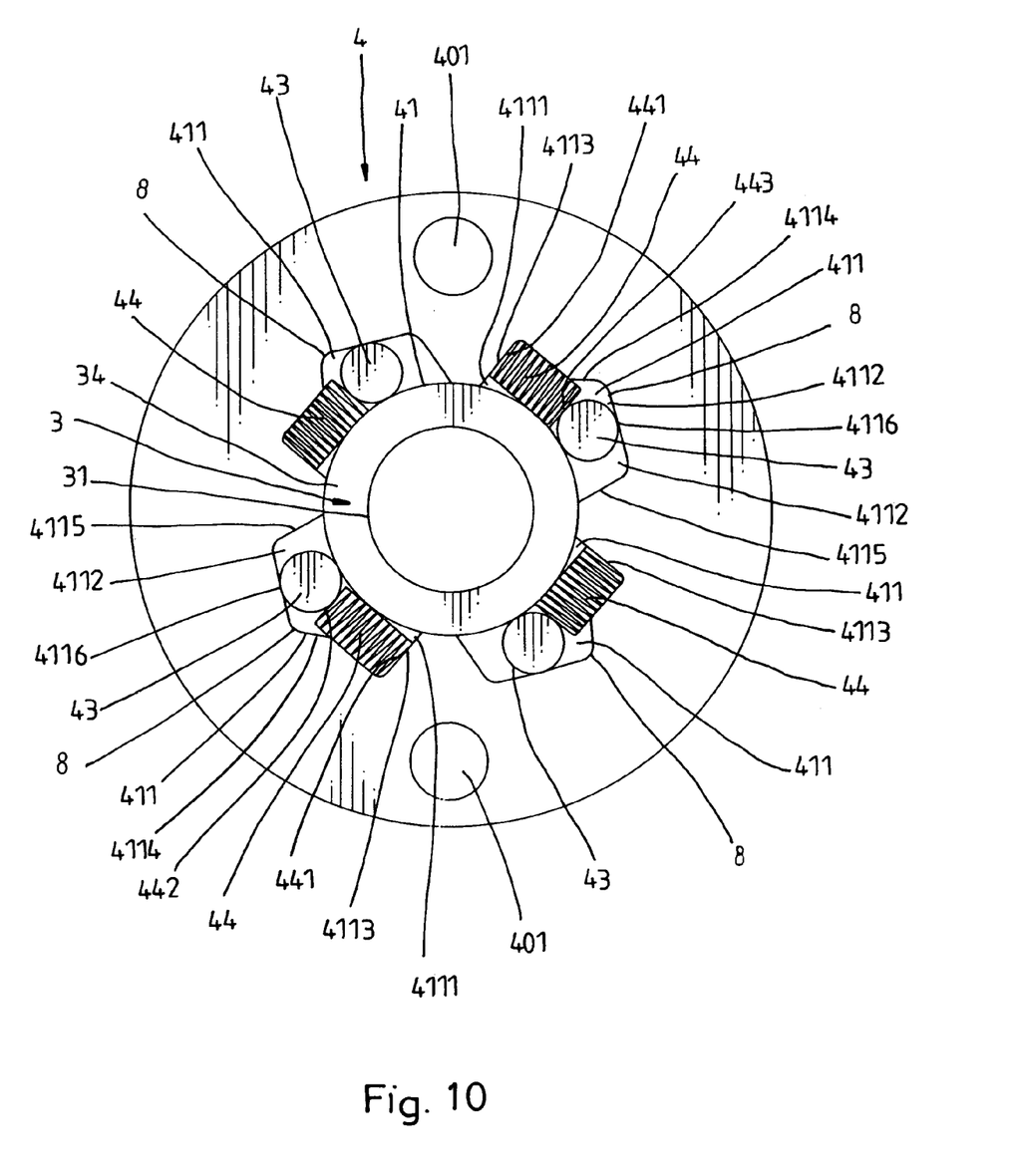
FIG. 10 is a front view of FIG. 9.

In an electric golf cart, a one-way bearing 9 (see FIG. 1) is used and mounted on the wheel axle to support the wheel for one-way rotation control. This design of one-way bearing 9 is functional, however it tends to be covered with dust. When covered with dust, the one-way bearing 9 becomes unable to function well and may break easily. In this case, the one-way bearing 9 must be removed from the wheel axle and well cleaned. However, when the user removes the one-way bearing 9 from the wheel axle, the internal needle rollers 91 may fall out of the one-way bearing 9. It is difficult to re-install the needle rollers 91 in the one-way bearing 9. Therefore, people usually will send the whole electric golf cart to the distributor for repair when the one-way bearing 9 is damaged. It is expensive to send the whole electric golf cart to the distributor for repair.

The present invention has been accomplished under the circumstances in view. It is therefore main object of the present invention to provide a one-way rotation control mechanism for use in an electric golf cart's wheel for controlling one-way rotation of the wheel, which is easily detachable for convenient maintenance. According to the present invention, the one-way rotation control mechanism comprises a bushing affixed to the wheel axle, and a clutch mounted in and fixedly connected to the wheel to control linking between the wheel and the fixed bushing at the wheel axle in one direction. In case the clutch cannot function well, the user can disconnect he clutch from the wheel remove it from the bushing easily for sending to the distributor for a repair work.

DETAILED DESCRIPTION OF THE INVENTION

Referring to FIGS. 2 through 10, an one-way rotation control mechanism is used in a golf cart, which comprises a wheel 2, a bearing 21 and a first bushing 23 mounted in the wheel 2, and a wheel axle 1 inserted through the axial hole 211 of the bearing 21 and the axial hole 231 of the bushing 23 to support rotation of the wheel 2. The wheel 2 has a first locating groove 24 and a second locating groove 25 respectively disposed at the two opposite sides thereof.

The one-way rotation control mechanism comprises a second bushing 3, a clutch 4, an outer cap 5, and an inner cap 7. The second bushing 3 comprises a rear big diameter portion 32, a front small diameter portion 34, an axial hole 31 axially extended through the rear big diameter portion 32 and the front small diameter portion 34, a collar 33 extended around the periphery between the rear big diameter portion 32 and the front small diameter portion 34, a locating hole 321 radially extended through the rear big diameter portion 32 across the axial hole 31, and a locating groove 342 extended around the periphery of the front small diameter portion 34 along the distal end remote from the collar 33. A pin 12 is inserted through the locating hole 321 of the second bushing 3 and a radially extended locating hole 11 of the wheel axle 1 to affix the second bushing 3 to the wheel axle 1.

The outer cap 5 is mounted in the first locating groove 24 of the wheel 2, comprising a first circular chamber 50 of a relatively bigger diameter, which accommodates the clutch 4, a second circular chamber 51 of a relatively smaller diameter, which is axially connected to the first circular chamber 50 and accommodates the collar 33 of the second bushing 3, an annular step 511 provided on the inside between the first circular chamber 50 and the second circular chamber 51 and stopped against the outer side 331 of the collar 33, and a plurality of through holes 512 axially extended through the front and rear sides thereof and spaced around the first circular chamber 50 and the second circular chamber 51.

The clutch 4 comprises a flat circular body 40 inserted into the first circular chamber 50 of the outer cap 5, which flat circular body 40 having a rear side 425 stopped at the inner side 330 of the collar 33 of the second bushing 3, a plurality of mounting through holes 401 axially extended through the flat circular body 40 and respectively aimed at the through holes 512 of the outer cap 5, a center opening 41 cut through the center area of the flat circular body 40 for the passing of the front small diameter portion 34 of the second bushing 3, a plurality of protruding portions 42 and recessed portions 411 respectively formed in the flat circular body 40 and alternatively spaced around the center opening 41, a plurality of springs 44 respectively mounted in the recessed portions 411, and a plurality of needle rollers 43 respectively mounted in the recessed portions 411 and respectively supported on the springs 44. Each protruding portion 42 has a smoothly inwardly curved bearing surface 421 kept in contact with the front small diameter portion 34 of the second bushing 3. Each recessed portion 411 defines a spring chamber 4111, which receives one spring 44, and a needle roller chamber 411, which receives one needle roller 43. The spring chamber 4111 has one lateral side terminating in a vertical wall 4113 that forms a part of the adjacent protruding portion 42, and the other lateral side disposed in communication with the needle roller chamber 4112. The needle roller chamber 4112 has two vertical sidewalls 4114 and 4115 and an inner wall 4116 connected between the two vertical sidewalls 4114 and 4115 (see FIG. 10). Each spring 44 has one end 441 stopped at the vertical wall 4113 of the respective spring chamber 4111, and the other end 442 stopped at the periphery of the respective needle roller 43. The inner wall 4116 is obliquely connected between the two vertical sidewalls 4114 and 4115. After mounting of the front small diameter portion 34 of the second bushing 3 in the center opening 41 of the clutch 4, the distance between the front small diameter portion 34 of the second bushing 3 and the part 8 of the inner wall 4116 of the needle roller chamber 4112 adjacent to the respective spring chamber 4111 is greater than the diameter of the needle rollers 43, however the distance between the front small diameter portion 34 of the second bushing 3 and the other end of the inner wall 4116 of the needle roller chamber 4112 is smaller than the diameter of the needle rollers 43.

The inner cap 7 is mounted in the second locating groove 25 of the wheel 2, comprising a plurality of screw holes 711 respectively aimed at the mounting through holes 401 of the clutch 4 and the through holes 512 of the outer cap 5.

Screw bolts 54 are respectively mounted in the through holes 512 of the outer cap 5 and the mounting through holes 401 of the clutch 4 with the respective threaded shanks 541 respectively threaded into the screw holes 711 of the inner cap 7 to secure the outer cap 5, the clutch 4 and the inner cap 7 together.

After mounting of the clutch 4 on the second bushing 3, a spring washer 35 is fastened to the locating groove 342 to secure the clutch 4 in place. Further, a washer 38 is mounted on the front small diameter portion 34 and stopped between the spring washer 35 and the clutch 4.

When rotating the clutch 4 in one direction (the clockwise direction), each needle roller 43 will be moved toward one vertical sidewall 4115 of the respective needle roller chamber 4112 far away from the respective spring chamber 4111 for free rotation, and therefore the clutch 4 can be freely rotated. On the contrary, when rotating the clutch 4 in the reversed direction (the counter-clockwise direction), each needle roller 43 will be moved toward the other vertical sidewall 4114 and will be jammed between the body 40 of the clutch 4 and the front small diameter portion 34 of the second bushing 3 to stop the clutch 4 from rotation. Because the clutch 4 is fastened to the outer cap 5 and the inner cap 7, clockwise rotation of the clutch 4 causes the wheel 2 to be synchronously rotated. Therefore, the clutch 4 controls one-way rotation of the wheel 2.

What is claimed is:

1. An one-way rotation control mechanism used in a wheel of a golf cart for controlling rotation of said wheel on a wheel axle in one direction, the one-way rotation control mechanism comprising:

a bushing mounted on said wheel axle inside said wheel, said bushing comprising a rear big diameter portion, a front small diameter portion, an axial hole axially extended through said rear big diameter portion and said front small diameter portion for the passing of said wheel axle, a collar extended around the periphery thereof between said rear big diameter portion and said front small diameter portion, a locating hole radially extended through said rear big diameter portion across the axial hole of said bushing, and a locating groove extended around the periphery of said front small diameter portion;

a pin inserted through the locating hole of said bushing and a radially extended locating hole of said wheel axle to affix said bushing to said wheel axle;

an outer cap mounted in one side of said wheel, said outer cap comprising a first circular chamber, a second circular chamber axially connected to said first circular chamber for accommodating a collar of a second bushing, an annular step provided on the inside between said first circular chamber and said second circular chamber and stopped against an outer side of said collar, and a plurality of through holes axially extended through front and rear sides thereof and spaced around said first circular chamber and said second circular chamber;

a clutch coupled between said bushing and said wheel, said clutch comprising a flat circular body inserted into said first circular chamber of said outer cap and stopped at an inner side of said collar of said bushing, a plurality of mounting through holes axially extended through said flat circular body and respectively aimed at the through holes of said outer cap, a center opening cut through a center part of said flat circular body for the passing of the front small diameter portion of said bushing, a plurality of protruding portions and recessed portions respectively formed in said flat circular body and alternatively spaced around said center opening, a plurality of springs respectively mounted in said recessed portions, and a plurality of needle rollers respectively mounted in said recessed portions and respectively supported on said springs, said protruding portions each having a smoothly inwardly curved bearing surface kept in contact with the front small diameter portion of said bushing, said recessed portion defining a spring chamber, which receives one said spring, and a needle roller chamber, which receives one said needle roller, said spring chamber having one lateral side terminating in a vertical wall and opposite lateral side disposed in communication with said needle roller chamber, said needle roller chamber having two vertical sidewalls and an inner wall connected between the two vertical sidewalls, said springs each having a first end stopped at the vertical wall of the respective spring chamber and a second end stopped at the periphery of one said needle roller, the distance between the front small diameter portion of said bushing and one end of said inner wall of the needle roller chamber of each said recessed portion of said clutch being greater than the diameter of said needle rollers, the distance between the front small diameter portion of said bushing and an opposite end of said inner wall of the needle roller chamber of each said recessed portion of said clutch being smaller than the diameter of said needle rollers, an inner cap mounted in one side of said wheel opposite to said outer cap; and fastening means mounted in the through holes of said outer cap and the mounting through holes of said clutch to affix said clutch to said inner cap and said outer cap.

2. The one-way rotation control mechanism as claimed in claim 1, further comprising a spring washer fastened to the locating groove of said front small diameter portion of said bushing to secure said clutch to said bushing, and a washer mounted on said front small diameter portion of said bushing and stopped between said spring washer and said clutch.

3. The one-way rotation control mechanism as claimed in claim 1, wherein said inner cap comprises a plurality of screw holes respectively aimed at the mounting through holes of said clutch and the through holes of said outer cap; said fastening means comprises a plurality of screw bolts respectively mounted in the through holes of said outer cap and the mounting through holes of said clutch and threaded into the screw holes of said inner cap to secure said outer cap and said clutch and said inner cap together.

* * * * *